US008118913B2

(12) United States Patent
Miller

(10) Patent No.: US 8,118,913 B2
(45) Date of Patent: Feb. 21, 2012

(54) GERMANE PURIFICATION

(75) Inventor: Gary D. Miller, Annandale, NJ (US)

(73) Assignee: Voltaix, LLC, Branchburg, NJ (US)

(*) Notice: Subject to any disclaimer, the term of this patent is extended or adjusted under 35 U.S.C. 154(b) by 114 days.

(21) Appl. No.: 12/619,001

(22) Filed: Nov. 16, 2009

(65) Prior Publication Data
US 2010/0122628 A1 May 20, 2010

Related U.S. Application Data

(60) Provisional application No. 61/115,132, filed on Nov. 17, 2008.

(51) Int. Cl.
B01D 53/02 (2006.01)

(52) U.S. Cl. .......................... 95/116; 95/133

(58) Field of Classification Search ............. 95/90, 117, 95/116, 133, 141, 900, 901, 902, 903, 93, 95/97, 104, 122, 123, 45, 55; 96/108, 132, 96/121, 144, 153, 154; 423/210, 644, 645; 502/400
See application file for complete search history.

(56) References Cited

U.S. PATENT DOCUMENTS

| 3,785,122 | A | * | 1/1974 | Yatsurugi et al. | 95/116 |
|---|---|---|---|---|---|
| 5,032,152 | A | * | 7/1991 | Vansant et al. | 95/95 |
| 5,385,689 | A | * | 1/1995 | Tom et al. | 252/194 |
| 6,406,519 | B1 | * | 6/2002 | Tom et al. | 95/95 |
| 6,716,271 | B1 | * | 4/2004 | Arno et al. | 95/133 |
| 6,733,734 | B2 | * | 5/2004 | Watanabe et al. | 423/219 |
| 7,087,102 | B2 | * | 8/2006 | Withers et al. | 95/116 |
| 7,160,360 | B2 | * | 1/2007 | Wu et al. | 95/117 |
| 7,591,985 | B2 | * | 9/2009 | Tezock | 423/210 |
| 2002/0078824 | A1 | * | 6/2002 | Tom et al. | 95/45 |
| 2003/0097929 | A1 | | 5/2003 | Watanabe | |
| 2004/0206241 | A1 | * | 10/2004 | Tempel et al. | 96/155 |
| 2005/0120877 | A1 | * | 6/2005 | Wu et al. | 95/117 |
| 2006/0188420 | A1 | * | 8/2006 | Alvarez et al. | 423/210 |
| 2009/0173225 | A1 | * | 7/2009 | Brestovansky et al. | 95/114 |
| 2009/0188392 | A1 | * | 7/2009 | Carruthers | 96/153 |
| 2010/0316562 | A1 | * | 12/2010 | Carruthers et al. | 423/648.1 |

FOREIGN PATENT DOCUMENTS

WO 03/037485 5/2003

OTHER PUBLICATIONS

Arnó et al., "Challenges and solutions for germane (GeH4) packaging," Solid State Technology, Jun. 2003.

* cited by examiner

Primary Examiner — Duane Smith
Assistant Examiner — Pankti Patel

(57) ABSTRACT

A process and system for the purification of germane containing phosphine to provide a purified germane product. One aspect of the present invention is a process for making a purified germane product containing less than 50 ppb of phosphine which comprises providing a phosphine contaminated germane gas hydrogen gas mixture; passing the germane gas hydrogen gas mixture through an adsorbent which selectively adsorbs phosphine and withdrawing therefrom a purified germane gas hydrogen mixture; and separating the purified germane gas from the hydrogen germane gas mixture.

12 Claims, 3 Drawing Sheets

CS0998, 4300 PPB PHOSPHINE (SMALL SAMPLE LOOP)

SS1077, SPIKED WITH 130 PPB PHOSPHINE

GERMANE PURIFICATION

CROSS-REFERENCED TO RELATED APPLICATIONS

This application claims priority from U.S. Provisional Ser. No. 61/115,132, filed Nov. 17, 2008, the disclosure of which is incorporated herein in its entirety.

BACKGROUND OF THE INVENTION

The provision of high purity gas streams is critically important in a wide variety of industrial and research applications. The rapid expansion of vapor-phase processing techniques, e.g. chemical vapor deposition, in the semiconductor industry has been associated with the deployment and use of manufacturing equipment that is totally reliant on the delivery of ultra-high purity process gases at the point of use in the semiconductor manufacturing facility.

Considering the impurities which are present in gas streams involved in semiconductor manufacturing, it is to be noted that the growth of high quality thin film electronic and optoelectronic cells by chemical vapor deposition or other deposition techniques is inhibited by a variety of low-level process impurities. These impurities can cause defects that reduce yields by increasing the number of rejects, which can be very expensive. These impurities may be particulate or chemical contaminants.

Chemical impurities may originate in the production of the source gas itself, as well as in its subsequent packaging, shipment, storage, and handling. Although manufacturers typically provide analyses of source gas materials delivered to the semiconductor manufacturing facility, the purity of the gases may change because of cross contamination or from contamination arising from improperly prepared containers, e.g. gas cylinders, in which the gases are packaged. Impurity contamination may also result from improper gas cylinder changes, leaks into downstream processing equipment, or unexpected contamination arising from such downstream equipment.

In numerous industrial and commercial processes, it may be desirable to provide high purity germane. One area in which high purity germane is typically required is in the fabrication of semiconductor devices such as transistors, diodes, integrated circuits, detectors, solar cells, and the like. In many of these applications, high purity germane is oftentimes used as a gas for deposition of silicon-germanium alloys or for doping of substrates. More recently, the commercial use of germanium tetrahydride by the semiconductor and solar cell manufacturers has steadily increased because of new technology that incorporates germanium into active silicon structures. This new technology requires that germane be produced at higher purity levels with less variability in impurity concentration.

Germane may contain a phosphine contaminate due to unexpected variation in raw materials, unexpected manufacturing process conditions or unexpected container related conditions. Separation of two molecules such as germane and phosphine of similar volatility and relatively similar molecular weight thereby reducing the unwanted material down to low, less than 50 ppb, levels has not been reported in the literature.

DETAILED DESCRIPTION OF THE INVENTION

Figure 1:
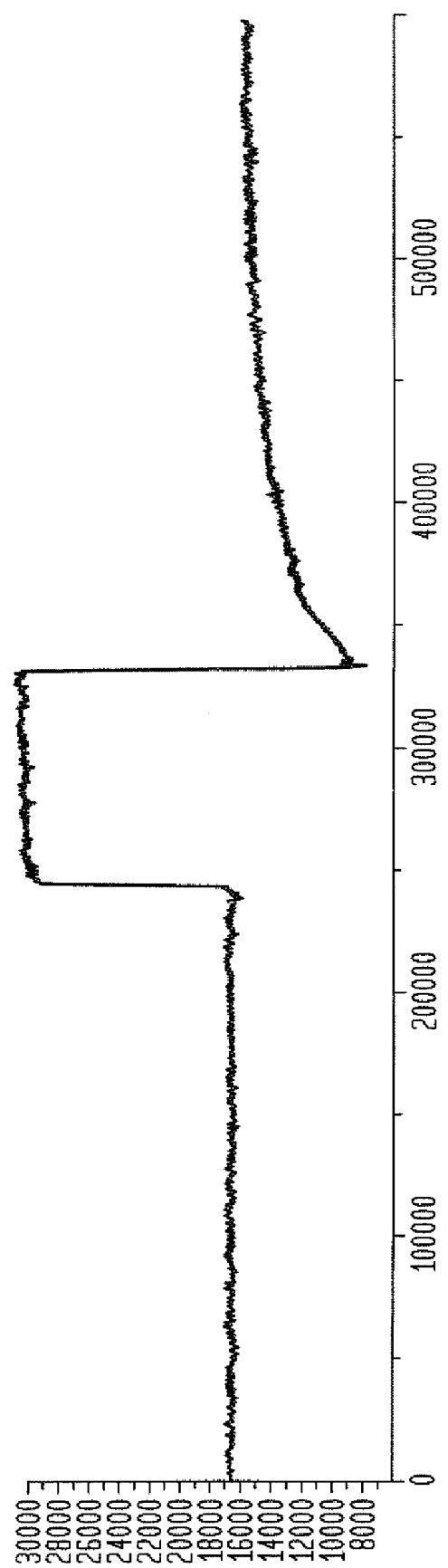
FIG. 1 is a chromatogram of a sample of germane in hydrogen containing no phosphine.

A process for the purification of germane gas contaminated with phosphine has been developed. The method is based on the discovery that phosphine, a compound with similar volatility and molecular size as germane may be selectively removed from a germane gas containing phosphine by a properly conditioned molecular sieve having an effective pore diameter of about 4 Angstroms or greater. Phosphine and germane have effective diameters of between 3 to 4 Angstroms. Phosphine is retained by the molecular sieve in preference to germane. Preferably, the molecular sieve has an effective pore diameter of about 5 Angstroms or greater. More preferably, the molecular sieve has an effective pore diameter of about 5 Angstroms.

Method:

Drying the Adsorbent:

The molecular sieve beds used in the present invention were dried by heating to 200° C. to 300° C. under a purge of dry helium for 4 to 12 hrs, then cooled to about 23° C. under a purge of dry helium. Dry gases such as nitrogen and hydrogen and the like may also be utilized for both the heating and cooling purges.

Conditioning:

The molecular sieve bed must be conditioned by being saturated with germane. Germane is strongly adsorbed onto freshly dried molecular sieves. This adsorption process releases heat and is notable for the near complete disappearance of the germane gas from the input gas stream. Typically an input conditioning gas stream comprising up to about 40% germane preferably from about 20 to 40% germane in hydrogen is passed through a sieve bed or maintained in contact with a sieve bed. Conditioning gas flow is maintained until the germane component is no longer appreciably retained by the sieve bed. Care must be taken to avoid bed overheating and potential decomposition/deflagration of germane. The sieve bed temperature is monitored to avoid overheating. A preferred sieve bed temperature is about 60° C. or less. The sieve bed temperature must be maintained below the decomposition/deflagration temperature of germane.

Molecular Sieve:

Typical examples of molecular sieves suitable in the present invention include types 4A, 5A, 10X and 13X. Such molecular sieves are available from a number of suppliers. These molecular sieves have an effective pore diameter of from about 4 Å or greater. Molecular sieves are synthetically produced zeolites characterized by pores and crystalline cavities of extremely uniform dimensions. Type 4A (4 Å) Molecular Sieve is the sodium form of the Zeolite. Type 4A will adsorb those molecules having a critical diameter of less than 4 Å (0.4 nm). Type 5A (5 Å) Molecular Sieve is the calcium form of the Zeolite. Type 5A will adsorb those molecules having a critical diameter of less than 5 Å (0.5 nm). Type 10X is a modified form of the sodium zeolite with an effective pore diameter of about 8 Å Type 13X is a modified form of the sodium zeolite with an effective pore diameter of about 10 Å (1 nm).

The preferred molecular sieve is type 5A which has the composition 0.80 $CaO:0.20\ Na_2O:Al_2O_3:2.0\pm0.1\ SiO_2:x\ H_2O$. Divalent calcium ions in place of sodium cations give apertures of about 5 Å.

The invention will be illustrated in more detail with reference to the following Examples, but it should be understood that the present invention is not limited thereto.

Purifying Germane

Example 1

A series of 12 gas cylinders containing pure germane were contaminated with up to about 4500 ppb phosphine in pure germane. The germane gas in ten of the cylinders was processed according the invention. Each of the cylinders were assayed for phosphine content. The ten cylinders containing the processed germane each contained less than 50 ppb phosphine. The detection limit of the assay for phosphine in this example was 50 ppb. The cylinders containing germane that were not processed to remove phosphine, CS0998 and CS0736, contained 4300 ppb and 4500 ppb phosphine respectively. The sample cylinders were assayed by Gas Chromatographic inductively coupled plasma mass spectrometry (GC-ICP-MS)

| Sample Cyl. | Phosphine, ppb | Method |
|---|---|---|
| SS0580 | <50 | GC-ICP-MS |
| LBS0640 | <50 | GC-ICP-MS |
| NP3611 | <50 | GC-ICP-MS |
| CS0976 | <50 | GC-ICP-MS |
| SS1077 | <50 | GC-ICP-MS |
| CS0746 | <50 | GC-ICP-MS |
| CS0577 | <50 | GC-ICP-MS |
| CS0998 | 4300 | GC-ICP-MS |
| CS0736 | 4500 | GC-ICP-MS |
| SO986 | <50 | GC-ICP-MS |
| CS1025 | <50 | GC-ICP-MS |
| SS1078 | <50 | GC-ICP-MS |

Method:

Above samples were analyzed by GC-ICP-MS. A 10 ppm stock standard of Phosphine was used for calibration and serially diluted from 10 ppm down to 130 ppb. Collision Cell Technology (CCT) was used in MS tuning to reduce interferences shifting m/z 31 to m/z 47 of Oxygen collision gas.

Conditions for Chromatographic Analysis:
Instrument: Thermo Scientific XSeries ICP-MS
Column: 80 m×0.32 mm GasPro
Carrier: Hydrogen at 20 psig
Oven: 45 degrees C. Isothermal
Sample size: 250 µl
Split: 2.5 mls/minute
Conditions for ICP-MS analysis:
Detector: ICP-MS at m/z 47, 500 ms dwell
Extraction: −94 v
Lens 1: −1130 v
Lens 2: −80 v
Lens 3: −189 v
Pole Bias: −3.8 v
Sampling Depth: 109
D1: −42.4 v
Focus: 6.7 v
CCT 0.06 mls/min
D2: −121 v
DA: −36 v
Hexapole Bias: −0.4 v
Add. Das 1: 187 mls/min Example 2

Conditioning Molecular Sieve with Germane

A sample of 20% germane (mole fraction) in hydrogen containing 16.895 kg germane was passed through a bed containing 54 kg of type 5A dry molecular sieve with a nominal bead size of 4×7 mesh (equivalent to ⅛" pellets) having a nominal effective pore diameter of about 5 Angstroms. The molecular sieve was contained in two columns in series each column was 8 feet long by 6 inches internal diameter. The process flow rate was 3 kg germane/hour. The germane gas was cryogenically collected, thereby separating the germane from hydrogen in the gas mixture. The germane was subsequently analyzed for phosphine. The amount of germane recovered was 9.339 kg. The molecular sieves in the column retained 7.556 kg germane.

The analysis of germane was carried out by the analytical procedure as described in example 1 above.

Example 3

Recovery of Germane

A sample of 20% germane (mole fraction) in hydrogen containing 28.375 kg germane was passed through the same molecular sieve bed conditioned in Example 2 containing 54 kg of type 5A dry molecular sieve having a nominal effective pore diameter of 5 Angstroms. This process took about 12 hours. The germane in hydrogen gas was collected and analyzed for germane. The amount of germane recovered was 28.120 kg. a 99.10% recovery.

FIG. 1 is a chromatogram of a sample of germane in hydrogen containing no phosphine. The sample was run with a 250 µl loop. Phosphine is not detected in the chromatogram.

Figure 2:
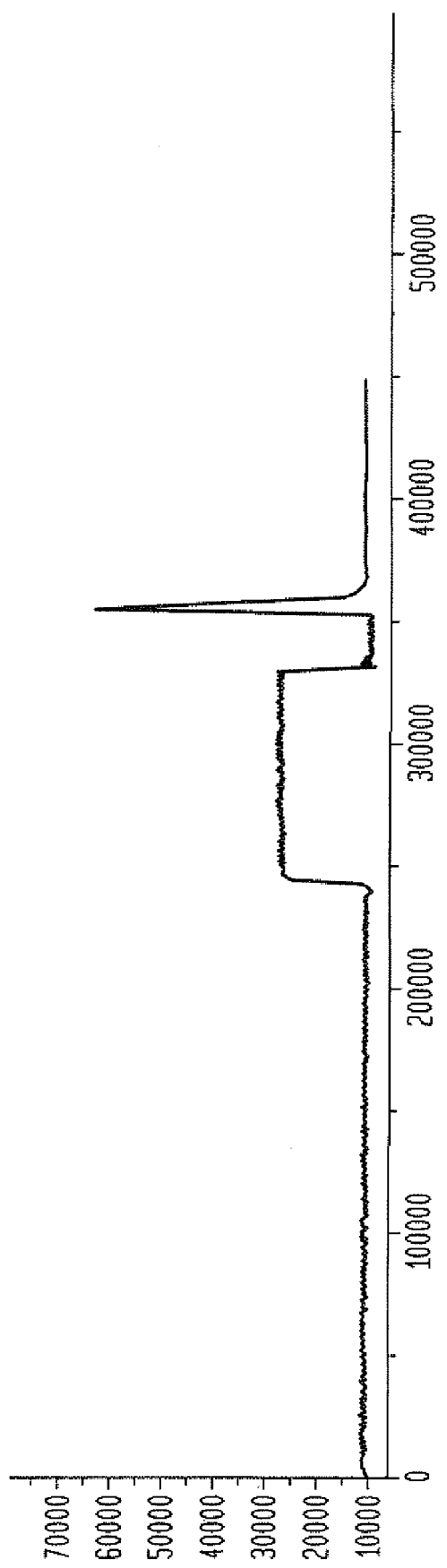
FIG. 2 is a chromatogram of a sample of germane in hydrogen containing 4300 ppb phosphine and FIG. 3 is a chromatogram of a sample of germane in hydrogen spiked with 130 ppb phosphine.

FIG. 2 is a chromatogram of a sample of germane in hydrogen with phosphine. The sample was run with a 100 µl loop. Phosphine is detected in the chromatogram at a retention time of 36000 ms.

Figure 3:
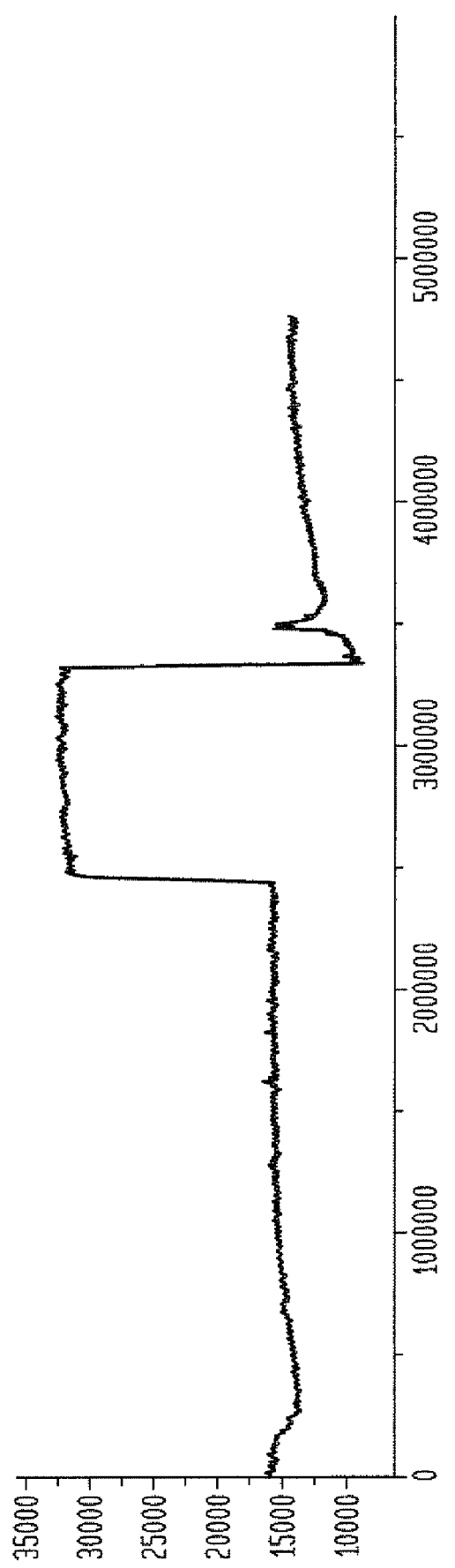

FIG. 3 is a chromatogram of a sample of germane in hydrogen spiked with 130 ppb phosphine. The sample was run with a 250 µl loop. Phosphine is detected in the chromatogram at a retention time of 36000 ms.

The sample containing 4300 ppb phosphine, FIG. 2, was run with a 100 µl loop to maintain linearity.

What is claimed is:

1. A process for making a purified germane gas comprising:
   providing a germane gas containing phosphine;
   drying a molecular sieve;
   conditioning the dried molecular sieve by passing a germane gas stream through the molecular sieve until the molecular sieve is saturated with germane;
   passing the germane gas containing phosphine through the conditioned molecular sieve which selectively adsorbs the phosphine contained therein; and
   withdrawing therefrom a purified germane gas;
   wherein the purified germane gas contains less than 50 ppb phosphine.

2. The process of claim 1 wherein the germane gas containing phosphine comprises up to about 40 percent germane in hydrogen.

3. The process of claim 1 wherein the germane gas containing phosphine comprises about 20 to about 40 percent germane in hydrogen.

4. The process of claim 2 further comprising separating the purified germane gas from hydrogen.

5. The process of claim 1 wherein the molecular sieve is a zeolite.

6. The process of claim 1 wherein the molecular sieve selected from the group consisting of 4A, 5A, 10X, 13X and combinations thereof.

7. The process of claim 6 wherein the molecular sieve is 5A.

8. The process of claim 1 wherein the molecular sieve has an effective pore diameter of about 4 Angstroms or greater.

9. The process of claim 1 wherein the molecular sieve has an effective pore diameter of about 4 Angstroms.

10. The process of claim 1 wherein the molecular sieve is dried under a purge of dry gas for about 4 to 12 hours.

11. The process of claim 1 wherein the molecular sieve is dried at 200.degrees C. to 300.degrees C.

12. The process of claim 1 wherein the molecular sieve is conditioned by passing a germane gas stream through the molecular sieve until germane is no longer appreciably retained on the molecular sieve.

* * * * *